United States Patent [19]

Moss

[11] Patent Number: 4,850,389
[45] Date of Patent: Jul. 25, 1989

[54] MOISTURE SEALING SYSTEM FOR AIRCRAFT SERVICING PIT

[76] Inventor: Kathyleen D. Moss, 7212 Patterson Dr., Garden Grove, Calif. 92641-1490

[21] Appl. No.: 188,205

[22] Filed: Apr. 29, 1988

[51] Int. Cl.[4] .............................................. F16L 5/00
[52] U.S. Cl. ....................................... 137/364; 52/20; 220/18; 277/3; 137/557
[58] Field of Search ............. 137/363, 364, 370, 234.6, 137/557, 614.03; 220/18; 244/114 R, 135 R; 277/2, 3; 52/20; 251/149.6

[56] References Cited

U.S. PATENT DOCUMENTS

| | | | |
|---|---|---|---|
| 2,315,453 | 3/1943 | Pittman | 220/18 |
| 3,106,099 | 10/1963 | Jeffrey et al. | 277/3 |
| 3,141,685 | 7/1964 | Watts | 277/3 |
| 4,104,169 | 8/1978 | Muller et al. | 277/3 |
| 4,269,240 | 5/1981 | Cutore | 137/363 |
| 4,278,115 | 7/1981 | Briles et al. | 52/20 |
| 4,295,653 | 10/1981 | Coles | 277/2 |
| 4,659,251 | 4/1987 | Petter et al. | 52/20 |

OTHER PUBLICATIONS

"Bottom Fuel Hydrant Pit Assembly", Culligan & McCallum, Garden Grove, Calif., Jan. 1981.
"Two Way Shut Off", Hanson Couplings, B8-H36, Hansen Corp., Feb. 1981.

Primary Examiner—A. Michael Chambers
Attorney, Agent, or Firm—Charles H. Thomas

[57] ABSTRACT

A subsurface pit for servicing aircraft on the ground and having walls with an opening into which a refueling conduit extends is provided with both a ground moisture seal and a pressure seal located about the moisture seal. Together the ground moisture seal and the pressure seal define a fluid tight cavity therebetween which is pressurized with air to approximately three pounds per square inch above atmospheric pressure. A pressure gauge is coupled to the pressure seal by means of a disconnectable fitting to allow pressure within the cavity between the seals to be externally monitored.

10 Claims, 1 Drawing Sheet

MOISTURE SEALING SYSTEM FOR AIRCRAFT SERVICING PIT

BACKGROUND OF THE INVENTION

1. Field of the Invention

The present invention relates to an improved system for forming a fluid tight interface between conduits entering a subsurface chamber for servicing aircraft and the walls of the chamber.

2. Description of the Prior Art

Aircraft docking areas at many air terminals are often provided with subsurface aircraft servicing pits located beneath the tarmac across which the wheels of aircraft roll while the aircraft are on the ground. Subservice aircraft servicing pits have the distinct advantage over mobile land vehicles used to service aircraft in that subsurface aircraft servicing pits do not provide obstacles to docking and departing aircraft and do not interfere with the maneuvering of aircraft in docking and refueling areas.

Conventional subsurface aircraft servicing pits are frequently formed as prefabricated fiberglass enclosures having hinged aluminum or steel access doors and hatches to allow access from above. The access doors are located flush with the surface of the aircraft loading and refueling aprons. Fuel pipes, electrical lines and conduits for supplying heated and cooled air emanate from central supply sources within an air terminal and extend underground beneath aircraft loading and refueling aprons and into subsurface aircraft servicing pits through openings in the walls of the pits.

When fuel pipes are brought into subsurface aircraft servicing pits they are terminated at valves or hydrants within the pits. Since aircraft fuel can be a form of toxic waste, if released into the environment, it is important to seal the subsurface access opening of the pit beneath the ground to prevent any spilled aircraft fuel from migrating out of the pit and into ground water. To this end the openings of aircraft servicing pits are conventionally provided with moisture or ground seals that extend from the walls of the pit to the outer surfaces of the pipes and ducts which enter through openings in the walls of the pit and which terminate within the pit.

Such ground moisture seals also prevent ground water from percolating up through the bottom of the pit or around pipes and ducts entering through openings in the pit. The exclusion of ground water from the chamber defined within the pit aids in preventing corrosion of the terminals and valves housed within the pits and also aids in guarding against short circuits to ground from electrical outlet terminating within the pit.

While conventional ground or moisture seals can be installed in pit openings to provide a fluid tight barrier, once installed such seals remain in position for prolonged periods of time under widely fluctuating weather and temperature conditions. Not infrequently, ground and moisture seals which are initially fluid tight do develop leaks over extended periods of time. Even a small amount of corrosion or contraction at an interface between a duct or conduit and a moisture seal will break the fluid tight barrier that was initially present when the pit was put into service As a result, fuel which may spill or leak from the fueling hydrant can reach the soil beneath the pit through discontinuities in the moisture barrier. Likewise, ground water can enter the pit through such crevices in the sealing system which do develop over periods of time. Since at present there is no way to detect the existence of liquids leaking out of an aircraft servicing pit, such leaks usually remain undetected.

SUMMARY OF THE INVENTION

One object of the present invention is to provide an aircraft servicing pit with a fluid tight seal which is not only far less likely to develop defects, but which also provides a means for detection of breaches in the fluid tight barrier installed when they occur. The fluid tight sealing arrangement of the invention provides a means for monitoring the integrity of the sealing arrangement and a safeguard which reveals the existence of discontinuities in the fluid sealing system designed to form a barrier between the chamber of the pit and the surrounding soil in which the pit is buried.

A related object of the invention is to provide a positive means for determining the integrity of a moisture barrier in an aircraft servicing pit long after the pit is initially installed. Once any defects or openings in the moisture barrier are discovered by means of the improvement of the invention, they can readily be repaired.

In one broad aspect the present invention may be considered to be an improvement to a subsurface pit for servicing aircraft on the ground having walls with an opening into which a fluid conduit extends and employing a moisture seal between the walls and the conduit. The improvement of the invention is comprised of a pressure seal between the walls and the conduit and located about the moisture seal. An enclosed cavity is thereby defined between the seals. The enclosed cavity is filled with pressurized gas, typically air, at a pressure greater than the ambient pressure that exists above the pressure seal.

Preferably, a fitting is provided in the pressure seal for releasably receiving a pressure gauge to monitor pressure within the enclosed cavity. An external check valve is also preferably connected to the fitting. The check valve allows gas under pressure to be introduced into the enclosed cavity, but prevents gas from leaking out of the pressurized cavity.

The invention may also be considered to be an improvement for a subsurface aircraft servicing pit located beneath a surface across which the wheels of an aircraft roll and formed with walls defining a subsurface opening therein through which a fluid conducting pipe enters and wherein a moisture seal extends from the pit walls to the pipe. The improvement is comprised of a pressure seal located on the side of the moisture seal opposite the wall opening and extending between the pit walls and the pipe to thereby define an enclosure between the moisture seal and the pressure seal. The enclosure is pressurized with a quantity of gas to a pressure exceeding ambient atmospheric pressure within the pit.

The invention may be described with greater clarity and particularity by reference to the accompanying drawings.

DESCRIPTION OF THE EMBODIMENT

Figure 1:
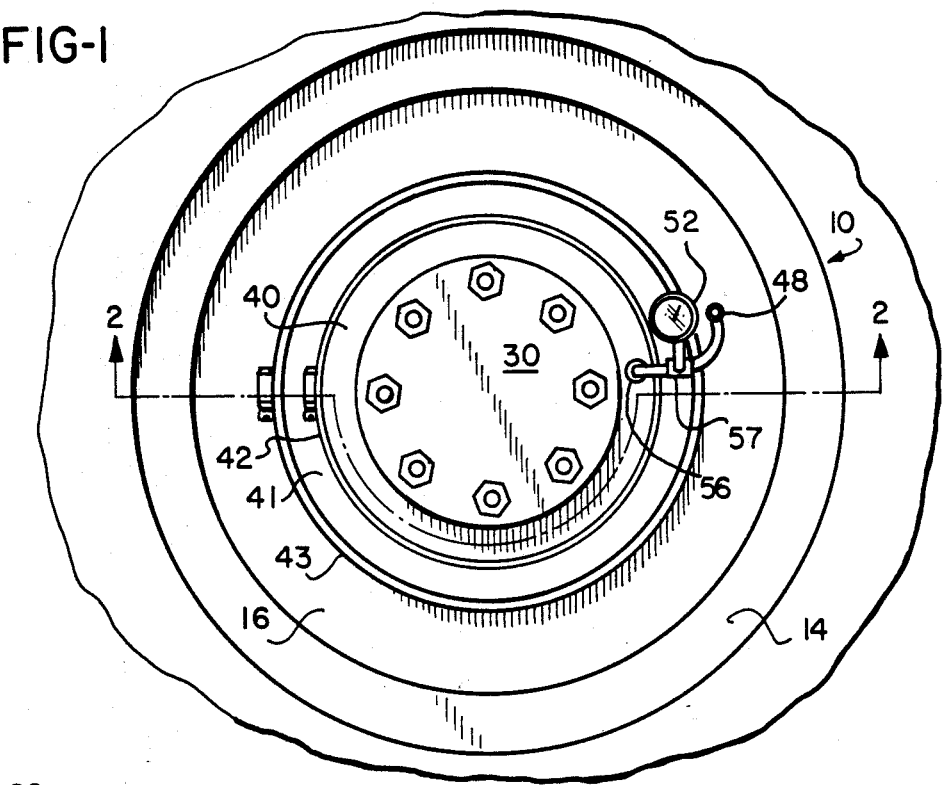
FIG. 1 is a top plan view showing the interior of a subsurface aircraft servicing pit with the door thereof removed and in which the improvement of the invention has been installed
Figure 2:
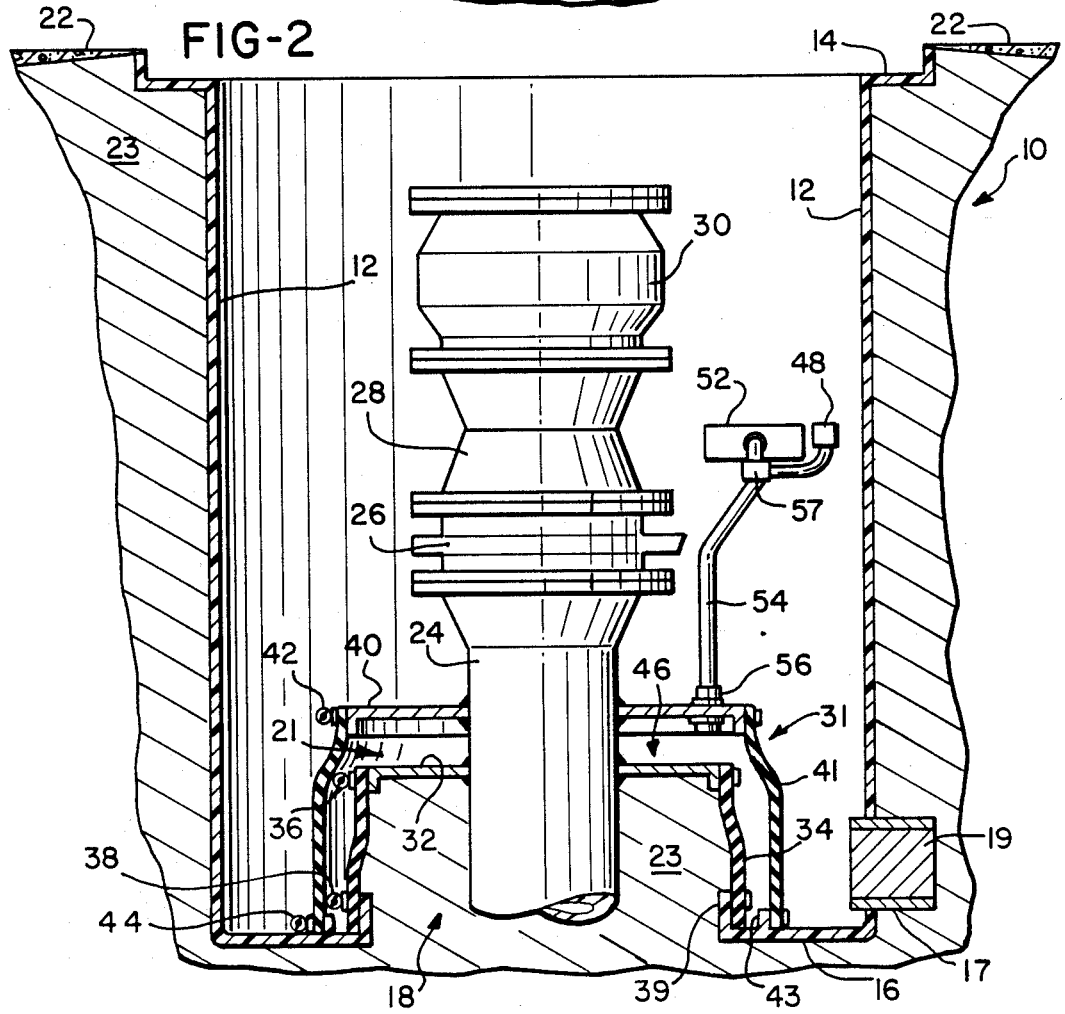
FIG. 2 is a sectional elevational view taken along the lines 2—2 of FIG. 1.

FIG. 1 illustrates a prefabricated aircraft servicing fuel hydrant pit assembly 10 formed of fiberglass with upright cylindrical side walls 12, an annular bottom wall 16 and having a horizontally disposed, radially extending annular bearing flange 14 with an upturned peripheral lip at its upper access opening. A three inch diameter polyvinyl chloride drain coupling 17 is provided in the side wall 12 near the bottom wall 16, but is plugged with a water impervious plug 19. The metal door assembly which seats on the bearing flange 14 to provide a closure for the pit assembly 10 has been omitted from the drawings to permit the interior of the pit 10 to be illustrated with greater clarity. A conventional prefabricated pit assembly of the type illustrated, without the improvement of the present invention, is manufactured as the model FPA—2436 Fiberglass Sealed Bottom Fuel Hydrant Pit Assembly by Dabico, Inc., located at 7212 Patterson Drive, Garden Grove, Calif. 92641-1490.

The fuel hydrant pit assembly 10 may have an inside diameter of five hundred ninety seven millimeters between the diametrically opposed surfaces of the walls 12 and may have a height of nine hundred fifty nine millimeters from the top of the flange 14 to the underside of the radially inwardly extending annular bottom wall 16. The walls 12 and 16 are formed as a unitary structure of fiberglass approximately 6.4 millimeters in wall thickness. A circular opening, indicated generally at 18, is defined at the center of the bottom wall 16. The opening 18 may have an internal diameter of thirteen inches.

The fuel hydrant pit 10 defines a chamber 20 located beneath a tarmac or concrete surface 22 across which aircraft travel while on the ground. The pit assembly 10 is buried in the soil 23 beneath the surface 22.

A cylindrical fuel duct or pipe riser 24 extends vertically upwardly and enters the opening 18 through the soil 23 from beneath the pit 10. The fuel duct or conduit riser 24. may, for example, be a steel pipe having an outer diameter of four inches. The pipe riser 24 is flared outwardly at its upper extremity where it joins a valve 26, which may, for example, be a four inch, one hundred fifty pound rated full lug pattern butterfly valve. Atop the valve 26 there is a four inch, one hundred fifty pound rated steel coupling 28, which is A.P.I welded and x-rayed. A four inch, one hundred fifty pound rated hydrant control valve 30, having an internal strainer therein is mounted atop the coupling 28.

As in conventional open bottom pits, a first annular steel boot seal collar 32 is welded throughout its internal circumference to the cylindrical exterior wall of the pipe riser 24. A sleeve-like moisture impervious, flexible coupling 34 is secured at its upper end to the rim of the steel boot seal collar 32 by means of a first stainless steel screw lock clamp band 36. A second annular steel screw lock clamp band 38 secures the lower end of the flexible coupling 34 to an inner upturned annular lip 39 of the fiberglass bottom wall 16 that extends radially inwardly from the side walls 12. The sleeve coupling 34 may be a Buna-N boot seal. Together, the steel boot seal collar 32 and the flexible sleeve coupling or boot 34 form a first moisture and fluid tight ground seal 21 across the opening 18 between the chamber 20 and the duct or riser pipe 24.

According to the improvement of the invention, a second or pressure seal 31 is provided about the first or moisture seal 21 by means of a second annular steel boot collar 40 and a second annular flexible sleeve-like boot 41. Like the first steel seal collar 32, the second steel collar 40 is welded throughout its inner perimeter to the pipe riser 24. The collar 40 is located vertically above the collar 32 and has an outer peripheral diameter slightly larger than that of the lower collar 32. For example, the outer diameter of the steel collar 40 may be twelve and three quarters inches, while the outer diameter of the lower steel collar 32 may be twelve inches.

The annular boot 41 is also a sleeve-like, moisture impervious, flexible coupling and may likewise take the form of a Buna-N boot seal. The boot or coupling 41 is secured to the outer periphery of the upper steel collar 40 at its upper end by a screw lock steel clamp band 42. The lower end of the coupling 41 is secured to an intermediate annular flange 43 which extends upwardly in a circular pattern from the bottom wall 18 concentrically about the lip 39. The coupling 41 is secured to the intermediate annular flange 43 by a screw lock steel clamp band 44. The steel clamp band 42 creates a fluid tight seal between the boot 41 and the steel collar 40 while the steel clamp band 44 establishes a fluid tight seal between the boot 41 and the wall 16 of the fiberglass pit 10.

The inner annular fiberglass lip 39 extends upwardly from the bottom wall 16 higher than intermediate annular flange 43 by a distance of approximately two inches. This height differential minimizes interference by the flange 43 in installing the steel clamp band 38. Together the steel collar 40 and the coupling 41 form a second or pressure seal 31 extending between the walls of the chamber 20 and the pipe riser 24.

A cavity 46 is defined between the second pressure seal 31 formed by the steel collar 40 and the outer coupling 41 and the ground seal 21 formed by the steel collar 32 and the inner coupling 34. Prior to welding the steel collar 40 to the pipe riser 24, the collar 40 is drilled to provide an aperture and a quick disconnect pneumatic fitting 56 is installed therewithin in fluid tight fashion. Once the steel collars 32 and 40 have been welded to the pipe riser 24 and both couplings 34 and 41 have been installed in place in sealed fashion, air is introduced into the cavity or enclosure 46 through the fitting 56 to establish a pressure within the enclosure 46 about three pounds per square inch greater than ambient atmospheric pressure about the second seal within the subsurface chamber 20.

Air is maintained under pressure in the enclosure 46 by an internal, releasable check valve within the fitting 56. The internal check valve in the fitting 56 will allow air under pressure to be forced through the fitting 56 into the enclosure or cavity 46, but will not allow air to escape therefrom unless it is purposefully released.

Preferably, a pneumatic coupling tube 54 is releasably connected to the fitting 56 and extends upwardly within the chamber 20 to a T-junction 57. The coupling tube 54 is equipped with a fitting which mates with the fitting 56 and unseats the internal check valve therewithin to allow free bi-directional air flow within the tube 54. A pressure monitoring gauge 52 is coupled to one leg of the T-junction 57. The pressure gauge 52 is supported above the collar 40 and is oriented so that the dial thereof can be read from above, as illustrated in FIG. 1. The fitting 56 in the pressure seal 31 thereby releasably receives the pressure gauge 52 to monitor pressure within the enclosed cavity 46. The monitoring gauge 52 is thereby releasably coupled or connected to the pressure seal 31, which is the second of the two seals 21 and 31, by means of the releasable fitting 56. The internal check valve in the fitting 56 prevents the passage of gas from the cavity 46 when the pressure gauge 52 is disconnected therefrom.

An external check valve 48 is coupled to the final leg of the T-junction 57 and is thereby connected to the fitting 56 by means of the pneumatic coupling tube 54. Gas under pressure is introduced into the enclosed cavity 46 through the external check valve 48.

Together the first and second seals 21 and 31 provide the subsurface pit 10 with double ground seal protection so that leakage of any fuel spilled from the hydrant 30 will not leak into the soil 23 beneath the pit 10, but will be trapped by either the second seal 31, the first seal 21, or both. This double seal feature significantly increases the extent to which contamination of soil 23 beneath the prefabricated pit 10 is prevented Moreover, by pressurizing the enclosure or cavity 46, a means is provided for monitoring the integrity of both the ground seal 21 and the pressure seal 31.

Once the seals have been established by installation of the collars 32 and 40 and the couplings 34 and 41, as previously described, the pressure within the enclosure 46 can be monitored externally by merely looking at the dial of the pressure gauge 52. The pressure gauge 52 should always register a pressure of about three pounds per square inch relative to the atmospheric pressure about the pressure seal 31 in the chamber 20. Should corrosion of the riser pipe 24, or any other deteriorative effect violate the fluid tight integrity of either the ground seal 21 provided by the collar 32 and the coupling 34 or the pressure seal 31 provided by the collar 40 and the coupling 41, air will escape from the enclosure 46 until pressure within the enclosure 46 equals pressure in the chamber 20 thereabove. If such a condition occurs, the pressure gauge 52 will register a pressure drop showing that the pressure within the enclosure 46 is no greater than the pressure within the surrounding chamber 20. Monitoring personnel are thus informed of the loss of seal integrity and can thereupon undertake the necessary repairs to reestablish the integrity of any defective seal in the system. Replenishing air can be supplied through the external check valve 48.

The present invention provides a simple, yet highly effective means of both providing double protection against ground contamination from fuel within an aircraft servicing pit, and also a means for monitoring the system for any defect. Undoubtedly, numerous variations and modifications of the invention will become readily apparent to those familiar with aircraft service pit sealing arrangements For example, it is to be understood that the application of the invention is not limited to use with prefabricated fiberglass pits, but is equally applicable to pits constructed of cast concrete as well as aircraft service pits of other designs. Also, the pressure seal and ground seal employed may assume numerous different configurations. Accordingly, the scope of the invention should not be construed as limited to the specific embodiment depicted and described herein, but rather is defined in the claims appended hereto.

I claim:

1. In a subsurface pit for servicing aircraft on the ground and buried in soil beneath an aircraft servicing apron and having walls with an opening into which a stationary fluid conduit extends and terminates in a valve and employing a moisture impervious, fluid tight moisture seal extending between and secured to both said walls and said conduit, the improvement comprising a moisture impervious, fluid tight pressure seal extending between and secured to both said walls and said conduit located above said moisture seal, thereby defining a fluid tight enclosed cavity between said seals, and pressurized gas within said enclosed cavity at a pressure greater than ambient pressure above said pressure seal.

2. The improvement according to claim 1 further comprising a fitting in said pressure seal for releasably receiving a pressure gauge to monitor pressure within said enclosed cavity.

3. The improvement according to claim 2 further comprising a check valve connected to said fitting through which gas under pressure is introduced into said enclosed cavity.

4. The improvement according to claim 2 further comprising a pressure gauge, releasably coupled to said fitting and disposed above said pressure seal.

5. An improvement for a subsurface pit located beneath a surface of a aircraft servicing apron across which the wheels of an aircraft roll and formed with walls defining a subsurface opening therein through which a stationary fluid conducting pipe enters and terminates in a valve located within said pit and wherein a moisture impervious, fluid tight moisture seal is secured to said pit walls and extends therefrom to said pipe to which it is also secured, comprising a moisture impervious, fluid tight pressure seal located on the side of said moisture seal opposite said opening and secured to said pit walls and extending therefrom to said pipe to which it is also secured to thereby define a fluid tight enclosure between said moisture seal and said pressure seal, and said enclosure is pressurized with a quantity of gas to a pressure exceeding ambient atmospheric pressure within said pit.

6. An improvement according to claim 5 further comprising a pressure monitoring gauge coupled to said pressure seal for monitoring the pressure level within said enclosure.

7. An improvement according to claim 6 further comprising a fitting on said pressure seal by means of which said monitoring gauge is releasably couple to said pressure seal.

8. In a chamber located beneath a surface of an aircraft servicing apron across which aircraft travel and having a subsurface opening through which a stationary fluid duct terminating in a valve enters and a moisture impervious, fluid tight ground seal at said opening extending between and secured to both said chamber and said duct, the improvement comprising a second moisture impervious, fluid tight seal extending between and secured to both said chamber and said duct such that said ground seal is located between said opening and said second seal to thereby define a fluid tight cavity between said ground seal and said second seal, and gas within said cavity under pressure greater than ambient atmospheric pressure within said subsurface chamber.

9. A chamber according to claim 8 further comprising a pressure gauge located above said second seal and coupled thereto to allow pressure within said cavity to be monitored externally thereof.

10. A chamber according to claim 8 wherein said pressure gauge is releasably connected to said second seal by means of a releasable fitting which prevents the passage of gas from said cavity when said pressure gauge is disconnected therefrom.

* * * * *